M. KIDNEY.
GRAPPLE FORK.
APPLICATION FILED MAY 21, 1908.
899,308.
Patented Sept. 22, 1908.
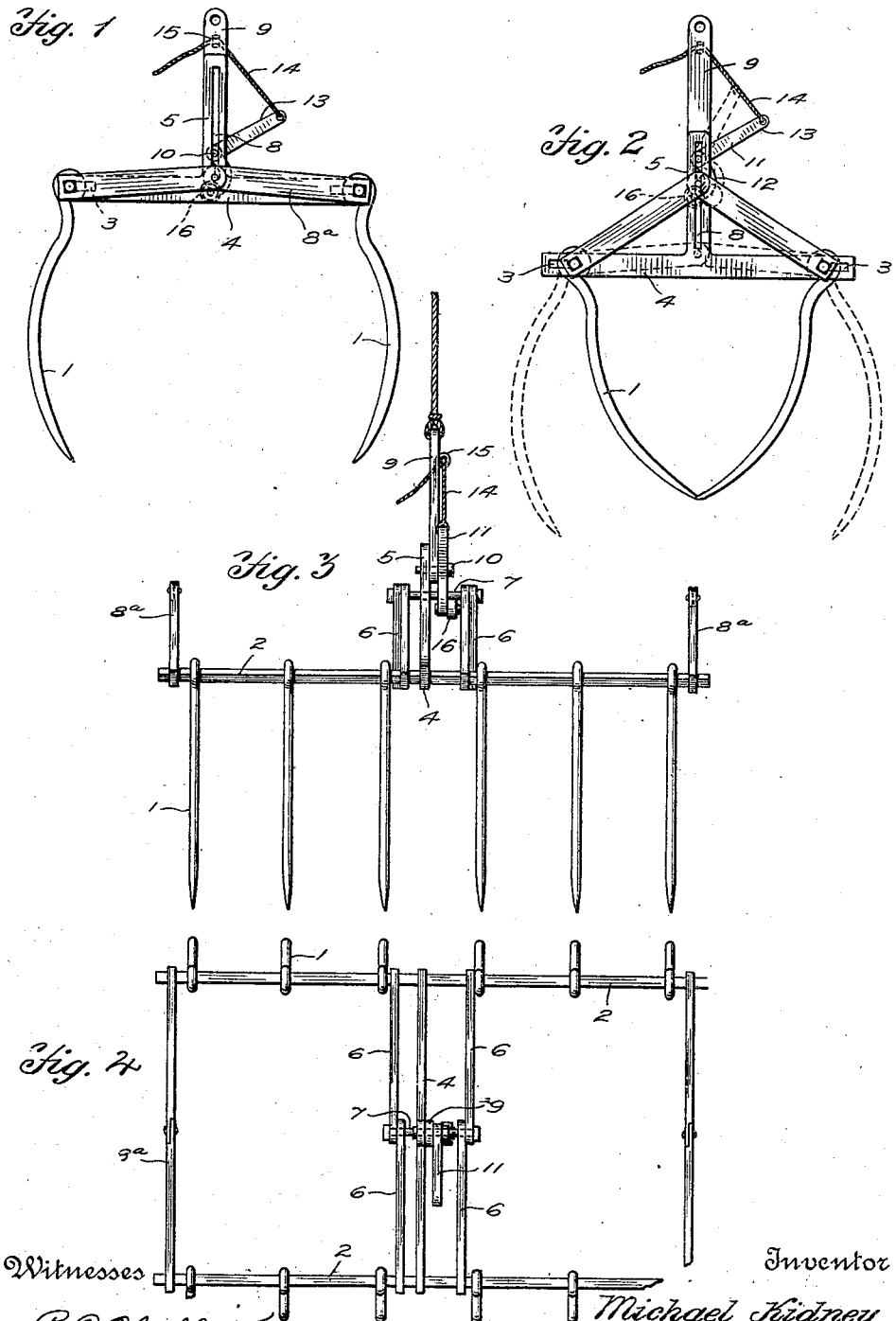
Witnesses
R. C. Claflin
W. Keane Small
Inventor
Michael Kidney
By Edson Bro's
Attorneys

UNITED STATES PATENT OFFICE.

MICHAEL KIDNEY, OF DOVER, NEW HAMPSHIRE.

GRAPPLE-FORK.

No. 899,308.      Specification of Letters Patent.      Patented Sept. 22, 1908.

Application filed May 21, 1908. Serial No. 434,176.

*To all whom it may concern:*

Be it known that I, MICHAEL KIDNEY, a citizen of the United States, residing at Dover, in the county of Strafford and State of New Hampshire, have invented certain new and useful Improvements in Grapple-Forks; and I do hereby declare the following to be a full, clear, and exact description of the invention, such as will enable others skilled in the art to which it appertains to make and use the same.

My invention relates to grapple forks for elevating or hoisting hay and other substances.

It has for its object to provide a fork of this class which is simple in construction, automatically closes when raised and which may be released or opened with ease when desired.

Other objects will become apparent from the following description.

The invention consists in the features of construction and combinations of parts hereinafter described and specified in the claims.

In the accompanying drawing, illustrating the preferred embodiment of my invention: Figure 1 is an end view of the fork open as before it is raised. Fig. 2 is a similar view of the fork closed as when it is being hoisted, the positions of the parts when the latch is thrown being shown in dotted lines. Fig. 3 is a side view of the device as shown in solid lines in Fig. 2, and Fig. 4 is a plan view of the device as shown in Fig. 1.

Referring more particularly to the drawings 1 designates the tines of the fork which are arranged in opposing groups, each attached to one of the rods 2. Said rods are loosely mounted in slots 3 in the opposite ends of a supporting strip 4 which is provided with an upright extension 5. Arms 6 have their outer ends rigidly connected to the rods 2 and their inner ends pivoted on a pin 7 which passes through a vertical slot 8 in the upright extension of the supporting strip. The outer ends of said rods are connected by rule jointed braces 8 which are so constructed that they are not permitted to be extended to a horizontal position which would interfere with the closing of the fork. A lifting bar 9 is attached to the upright extension of the supporting strip by means of a pivot lug 10 engaging the vertical slot in the latter. Said lug also serves as a pivot for the latch 11 which is provided with a hook portion 12 adapted to engage the pin 7, and an operating arm 13 to which is attached a cord 14 running through an eye 15 on said lifting bar. The hooked portion of the latch carries a small roller 16 which contacts with the pin 7 whereby said hooked portion may be easily disengaged from said pin when the operating lever is actuated.

When the fork in the position shown in Fig. 1 is elevated, as by a cable or rope attached to the lifting bar, the opposite groups of tines will be automatically closed upon one another as shown in solid lines in Fig. 2, because of the connection of said lifting bar with the arms 6 by means of the latch engaging the pin 7. When the fork has reached the proper point for delivery of its load a pull on the cord 14 which is attached to the operating arm of the latch will release the hooked portion of said latch from the pin 7 and whereupon the weight of the load will extend or open the tines, as shown in dotted lines in Fig. 2, thereby effecting a discharge.

I claim:

1. In a grapple-fork, the combination, with opposing tines mounted on two rods, a supporting strip having slots near its ends in which said rods are loosely mounted, said strip having an upright extension provided with a vertical slot, arms rigidly secured to said rods at their outer ends, a pin around which the inner ends of said arms are pivoted and which extends through the slot in the extension of said supporting strip, a lifting bar having sliding connection with said upright extension of the supporting strip by means of the slot in the latter, a latch pivotally mounted on said lifting bar and adapted to engage the pin on which said arms are pivoted and means to release said latch from said pin when desired.

2. In a grapple-fork, the combination, with opposing tines mounted on two rods, a supporting strip having slots near its ends in which said rods are loosely mounted, said strip having an upright extension provided with a vertical slot, arms rigidly secured to said rods at their outer ends, a pin around which the inner ends of said arms are pivoted and which extends through the slot in the extension of said supporting strip, a lifting bar having sliding connection with said upright extension of the supporting strip by means of a pivot lug engaging the slot in said extension, a latch pivoted on said pivot lug and adapted to engage the pin on which said arms are pivoted, and means to release said latch from said pin when desired.

3. In a grapple-fork, the combination, with opposing tines mounted on two rods, a supporting strip having slots near its ends in which said rods are loosely mounted, said strip having an upright extension provided with a vertical slot, rule-jointed braces connecting the ends of said rods, arms rigidly secured to said rods at their outer ends, a pin around which the inner ends of said arms are pivoted and which extends through the slot in the extension of said supporting strip, a lifting bar having sliding connection with said upright extension of the supporting strip by means of the slot in the latter, a latch pivotally mounted on said lifting bar and adapted to engage the pin on which said arms are pivoted, and means to release said latch from said pin when desired.

4. In a grapple-fork, the combination, with opposing tines mounted on two rods, a supporting strip having slots near its ends in which said rods are loosely mounted, said strip having an upright extension provided with a vertical slot, arms rigidly secured to said rods at their outer ends, a pin around which the inner ends of said arms are pivoted and which extends through the slot in the extension of said supporting strip, a lifting bar having sliding connection with said upright extension of the supporting strip by means of the slot in the latter, a hook-shaped latch pivotally mounted on said lifting bar and adapted to engage the pin on which said arms are pivoted, a roller on the end of said latch which engages said pin, and means to release said latch from said pin when desired.

5. In a grapple-fork, the combination, with opposing tines mounted on two rods, a supporting strip having slots near its ends in which said rods are loosely mounted, said strip having an upright extension provided with a vertical slot, arms rigidly secured to said rods at their outer ends, a pin around which the inner ends of said arms are pivoted and which extends through the slot in the extension of said supporting strip, a lifting bar having sliding connection with said upright extension of the supporting strip by means of the slot in the latter, a latch pivotally mounted on said lifting bar and having a hook to engage the pin on which said arms are pivoted, said latch also provided with an operating lever, and a cord secured to said lever and passed through an eye on the lifting bar for releasing said latch from said pin when desired.

In testimony whereof, I affix my signature, in presence of two witnesses.

MICHAEL KIDNEY.

Witnesses:
WILLIAM F. WHITE,
JOSEPH AGNEW.